United States Patent [19]

Conner et al.

[11] 4,387,114

[45] Jun. 7, 1983

[54] SPINDLE APERTURE REINFORCEMENT FOR A FLOPPY DISK

[75] Inventors: Alfred W. Conner, Palo Alto; J. Reid Anderson, Los Altos Hills, both of Calif.

[73] Assignee: Verbatim Corporation, Sunnyvale, Calif.

[21] Appl. No.: 208,516

[22] Filed: Nov. 20, 1980

[51] Int. Cl.³ .............................................. B05D 3/06
[52] U.S. Cl. .................................. 427/54.1; 101/150; 101/154; 427/284; 427/286
[58] Field of Search ................ 427/256, 260, 277, 284, 427/285, 286, 54.1; 101/150, 154, 33, 34; 360/135

[56] References Cited

U.S. PATENT DOCUMENTS 1,155,352  10/1915  Grass .................................... 101/150
4,209,551  6/1980  Masaki et al. ........................ 427/286

OTHER PUBLICATIONS

Pitts IBM Tech. Disc. Bull., vol. 20, No. 9, Feb. 1978.

*Primary Examiner*—John H. Newsome
*Attorney, Agent, or Firm*—Thomas E. Schatzel

[57] ABSTRACT

An improved reinforcement member for a central aperture in a flexible recording disk and a method for forming the same. The improved reinforcement comprises an integral, annular-shaped ring formed on one or both sides of the flexible recording disk about the central aperture thereof. This improved reinforcement is formed by transfer printing a liquid image of the reinforcement member onto a side surface of the flexible recording disk and then subsequently solidifying that liquid image. The liquid image to be transfer printed onto the flexible recording disk is first established by filling a metering reservoir shaped to be an image of the reinforcement member with a solidifying liquid. A terminal end of compliant rubber tampon is then first contacted to the reservoir thereby picking up the liquid image which is then contacted to the surface of the flexible disk to be deposited there. In the preferred embodiment of this invention, the solidifying liquid material comprises a cross-linkable, non-solvent based polyolefin monomer material in combination with a cross-linking agent which, when exposed to ultraviolet light, creates free radicals whereby the monomer material is caused to cross-link and hence polymerize into a solid.

9 Claims, 11 Drawing Figures

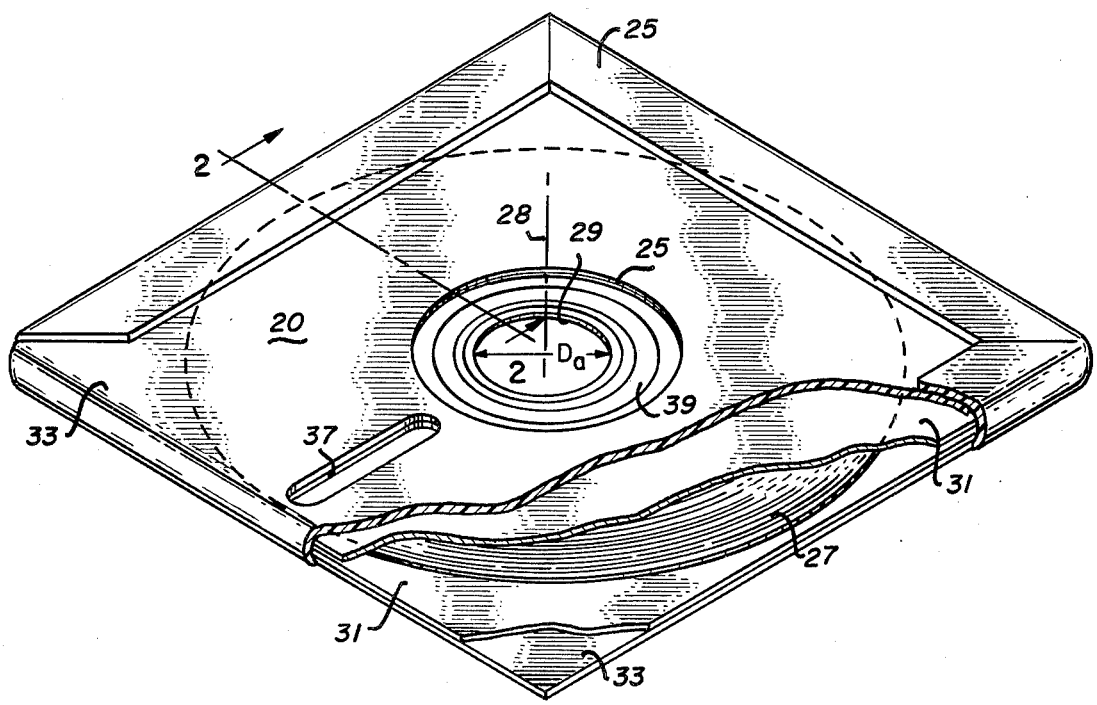
Fig_1 (PRIOR ART)
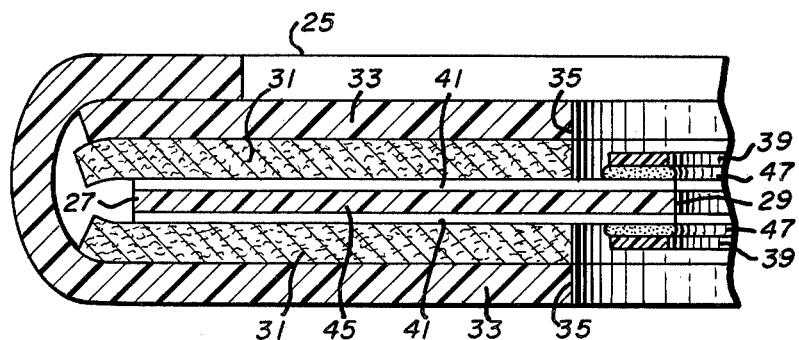
Fig_2 (PRIOR ART)
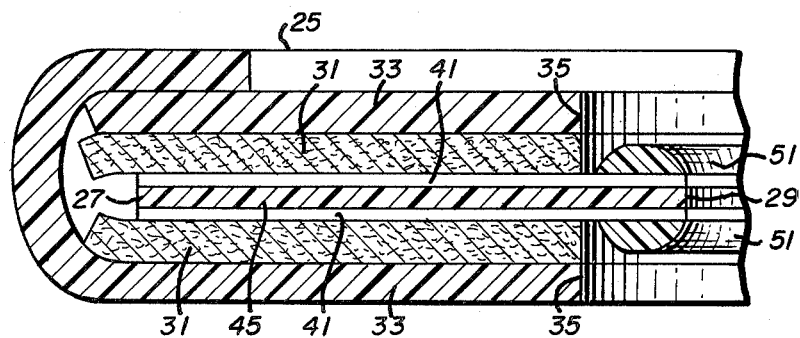
Fig_3

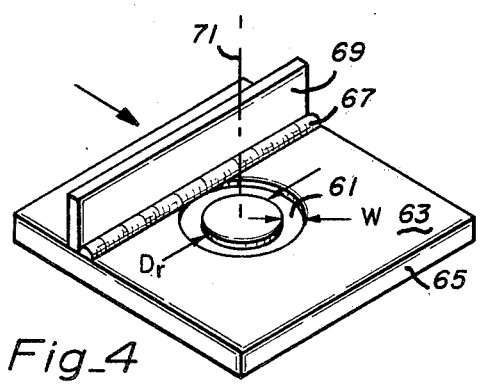
Fig_4
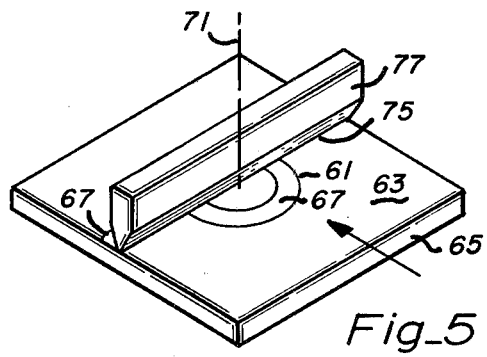
Fig_5
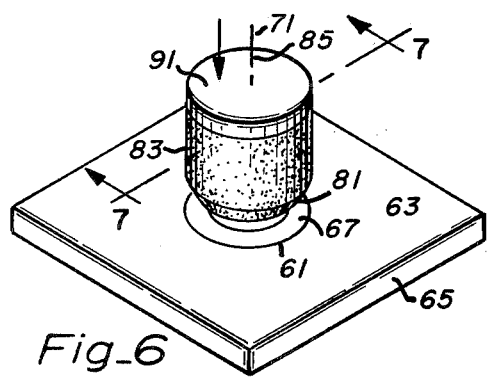
Fig_6
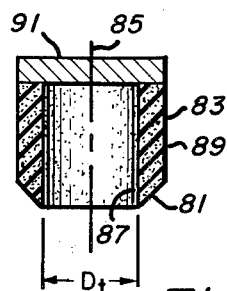
Fig_7
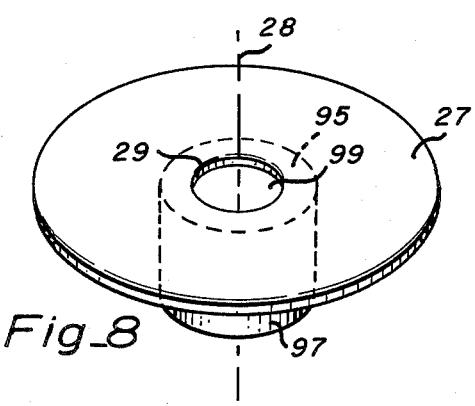
Fig_8
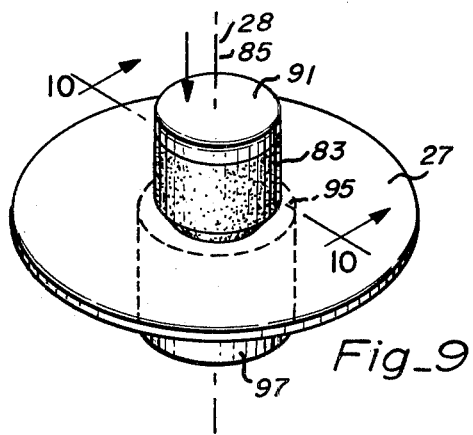
Fig_9
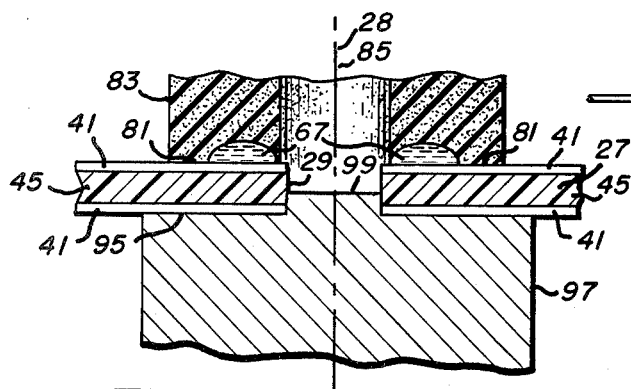
Fig_10
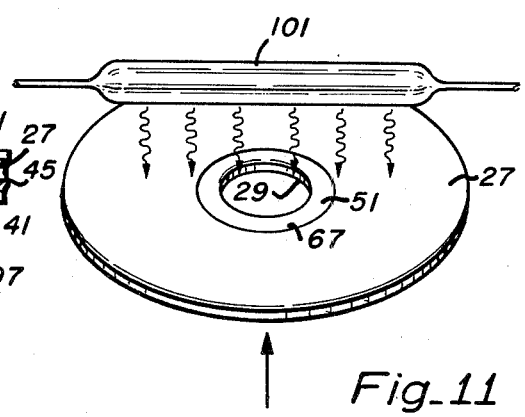
Fig_11

SPINDLE APERTURE REINFORCEMENT FOR A FLOPPY DISK

BACKGROUND OF THE INVENTION

1. Field of the Invention

This invention relates to the field of magnetic recording and more particularly to an improved floppy disk of the type used in digital data storage units and a method of manufacturing the same.

2. Description of the Prior Art

Widely used in the computer industry is a removable and interchangeable data storage medium assembled by enclosing a circular disk of flexible material coated with magnetic particles within an envelope. These assemblies are known in the trade as "floppy disks." A method of constructing floppy disk assemblies is described in U.S. Pat. No. 3,668,658 issued to Flores, et al. Both the envelope and the flexible recording disk contained therein, as described in that patent, are formed with a circular aperture passing through their respective centers. In accordance with that patent, the diameter of the circular aperture formed through the envelope is larger than that formed through the flexible recording disk. A larger aperture is formed in the envelope to permit engagement of the recording disk contained therein by a drive spindle of an apparatus used to write data to and read data from the flexible disk. Engagement of the flexible recording disk by the drive spindle is necessary to permit its rotation within the envelope by the reading and writing apparatus so that all the storage area of the circular data tracks thereof may be accessed. This rotation of the flexible recording disk requires the disk material immediately surrounding the central aperture to transmit the total force needed to rotate the disk within its envelope. Furthermore, because the envelope which contains the flexible recording disk is larger than the outer diameter of that disk, the disk in an assembly removed from the reading and writing apparatus is free to move within its envelope. Thus, upon reinsertion into the reading and writing apparatus, the central aperture in the flexible recording disk may not be in alignment with the spindle thereof. Consequently, the spindle of the reading and writing apparatus is designed to enter a misaligned central aperture in a flexible recording disk to apply a force to the material immediately surrounding it and cause the aperture to become centered thereabout when engagement is completed.

Thus, due to the stress applied by the forces of engagement and rotation, it has been observed that the material of the flexible recording disk immediately surrounding the central aperture becomes damaged in the normal course of an assembly's use. Ultimately, this damage may become so extensive as to render the floppy disk assembly totally inoperable. However, even if such damage is not so severe as to render the floppy disk assembly totally inoperable, it may be the source of reading failures upon dismounting and remounting the floppy disk assembly in the reading and writing apparatus. This type of reading failure may be caused by misalignment of a flexible recording disk having a damaged central aperture with the spindle which engages it. Such misalignment, which causes the center of previously written data tracks to be displaced from the center of rotation of the spindle, may cause the data stored thereon to be unreadable due to excessive oscillation of the data track with respect to the reading apparatus. This type of failure may sometimes be apparently cured by merely again dismounting and remounting the floppy disk assembly.

A means for reducing this damage includes mechanically reinforcing the region of the flexible recording disk immediately surrounding the central aperture. One such reinforcement structure is described in U.S. Pat. No. 4,052,750 issued to Barber, et al. The structure and method described there, consists of adhesively bonding a punched annular-shaped piece of structural material to the surface of the flexible recording disk about its central aperture. That patent further describes that the reinforcement, so applied, must have certain frictional properties to permit proper mechanical engagement by the reading and writing apparatus and certain electrical properties to allow dissipation of static electrical charges which may build up on the flexible recording disk. However, fabricating floppy disk assemblies in accordance with that description makes it difficult to obtain consistently good registration between the edges of the central aperture in the flexible recording disk and the edges of the annular-shaped structural reinforcing member. Furthermore, long term usage of floppy disk assemblies constructed in accordance with that description result in the adhesive bonding the annular-shaped reinforcing member to the surface of the flexible recording disk oozing from between those members to project within the diameter of the central aperture. Consequently, in time, the spindle of the reading and writing apparatus engaging the flexible recording disk becomes contaminated with that adhesive.

SUMMARY OF THE PRESENT INVENTION

An object of the present invention is to provide an improved reinforcement about the central aperture of a flexible recording disk.

Another object is to provide a reinforcement about the central aperture of a flexible recording disk which will not ultimately project thereinto and thereby contaminate reading and writing apparatus upon which it is mounted.

Another object is to provide a reinforcement member for the central aperture of a flexible recording disk having improved mechanical properties.

Another object is to provide a reinforcement member for the central aperture of a flexible recording disk having more uniform electrical properties.

Another object is to provide a reinforcement member for the central aperture of a flexible recording disk which facilitates engagement of that aperture by a spindle of a reading and writing apparatus.

Another object is to provide a lower cost and simpler method of reinforcing the central aperture of a flexible recording disk.

Another object is to provide a method for reinforcing the central aperture of a flexible recording disk which produces fewer defective disks.

Briefly, in a preferred embodiment, the present invention includes an integral, electrically conductive, annular-shaped ring of polymerized polyolefin material bonded to one or both side surfaces of a flexible recording disk about the central aperture thereof. This reinforcing member is formed by transfer printing a ring of liquid polyolefin monomer onto the surface of the flexible recording disk and then causing that monomer to cross-link by exposing it to ultraviolet radiation. The transfer printing process employed to establish the ring of liquid monomer prior to polymerization includes first filling a metering reservoir having substantially the same shape as the reinforcing member to be formed with a quantity of the monomer. The reservoir is then contacted by a terminal end surface of a soft, compliant rubber tampon to which the liquid in the metering reservoir adheres. The rubber tampon is then contacted to the side surface of a flexible recording disk about the central aperture thereby establishing thereon, in liquid, the reinforcement member being formed. Subsequent exposure of the pattern to ultraviolet radiation polymerizes the liquid thereby completing the fabrication of the reinforcement.

The reinforcement for the central aperture of a flexible recording disk formed in the foregoing manner has improved mechanical properties. It is integrally bonded directly to the surface of the flexible recording disk rather than being separated therefrom by a layer of relatively soft adhesive. The integral nature of the reinforcement also causes it to exhibit more uniform electrical properties since it is monolithic rather than being formed by alternating layers of materials having differing properties. Lastly, the transfer printing process employed in this method of forming a reinforcement produces an annular member having sloped, rather than square, edges. The sloped shape of these edges assists in centering the central aperture of the flexible recording disk about the spindle during initial engagement thereof by the reading and writing apparatus.

An advantage of the present invention is that an improved reinforcement for the central aperture of a flexible recording disk is obtained.

Another advantage is that a totally rigid reinforcement for the central aperture of a flexible recording disk is obtained.

Another advantage is that the mechanical properties of the reinforcement about the central aperture of a flexible recording disk are improved.

Another advantage is that the electrical properties of the reinforcement member about the central aperture of a flexible recording disk are more uniform.

Another advantage is that the shape of the reinforcement formed about the central aperture of a flexible recording disk facilitates engagement thereof by the spindle of the reading and writing apparatus.

Another advantage is that forming a reinforcement about the central aperture of a flexible recording disk is simpler and cheaper.

Another advantage is that fewer defectively reinforced flexible recording disks are produced.

These and other objects and advantages of the present invention will no doubt become obvious to those of ordinary skill in the art after having read the following detailed description of the preferred embodiment as illustrated in the various drawing figures.

IN THE DRAWING

FIG. 1 is a perspective, partially sectioned view of a floppy disk assembly of the prior art;

FIG. 2 is a cross-sectional view along the line 2—2 of the prior art floppy disk assembly of FIG. 1;

FIG. 3 is a cross-sectional view, similar to FIG. 2, but of a floppy disk assembly of the present invention;

FIG. 4 is a perspective view of a metering reservoir with liquid;

FIG. 5 is a perspective view of the reservoir of FIG. 4 illustrating establishing the quantity of liquid in the filled metering reservoir;

FIG. 6 is a perspective view of the reservoir showing a tampon about to pick-up the liquid established in the reservoir in FIG. 5;

FIG. 7 is a cross-sectional view of the tampon taken along the line 7—7 of FIG. 6;

FIG. 8 illustrates a flexible recording disk positioned on an anvil in preparation for contacting by the tampon of FIG. 6;

FIG. 9 illustrates the tampon of FIG. 6 contacting the flexible recording disk of FIG. 8;

FIG. 10 is a cross-sectional view of the tampon, liquid, flexible recording disk and anvil along the line 10—10 of FIG. 9; and FIG. 11 illustrates solidification of the liquid on the surface of the flexible recording disk.

DETAILED DESCRIPTION OF THE PREFERRED EMBODIMENT

FIG. 1 illustrates a floppy disk assembly referred to by the general reference number 20. The assembly 20 includes an envelope 25 and a circular, flexible recording disk 27. The circular disk 27 has a central axis 28 normal to its planar surface and a circular aperture 29 having a diameter "$D_a$" centered about the axis 28. The envelope 25, into which the circular disk 27 is inserted and sealed, is formed from a sheet of material fabricated by bonding a liner 31 made from porous, low-friction, antistatic material to a layer of solid material 33. The envelope 25 has a circular aperture 35 located about its center and an oval aperture 37 located symmetrically about a line from the center of the circular aperture 35 orthogonal to a side of the envelope 25. The aperture 35 is larger in diameter than the circular aperture 29 in the flexible recording disk 27. Secured to one or both side surfaces of the flexible recording disk 27 about its central aperture 29 and contained within the aperture 35 of the envelope 25 is an annular-shaped reinforcement member 39. When installed in a drive mechanism, a means for rotating the circular disk 27, such as a spindle, passes through the circular aperture 35 and partially through the circular aperture 29 to engage the circular disk 27 and to rotate it about its center. When information is to be recorded or reproduced from the rotating circular disk 27, a transducing means is inserted through the oval aperture 37 to contact the recording surface of the circular disk 27.

The flexible recording disk 27, shown in cross-section in FIG. 2, is fabricated by applying a coating 41 comprised of small particles of magnetic material, a binder and a lubricant, to one or both sides of a sheet of flexible material 45. As described in the prior art of U.S. Pat. No. 4,052,750 issued to Barber et al, the punched reinforcement member 39 is bonded to the surface of the coating 41 by means of an adhesive layer 47 located therebetween.

Shown in FIG. 3 is a reinforcement member 51 formed on the surface of the flexible recording disk 27 in accordance with the teachings of this invention. The reinforcement member 51 comprises an integral, annular-shaped ring of polymerized polyolefin material surrounding the central aperture 29 which bonds directly to the coating 41.

The first step in the process for forming the reinforcement member 51, as illustrated in FIG. 4, is filling an open metering reservoir 61 recessed into a planar surface 63 of a plate 65 with a liquid 67. The reservoir 61 is filled by drawing a squeegee 69 across the surface 63 so as to drive a quantity of liquid 67 ahead of it thereby coating the surface 63 and over filling the reservoir 61. After the metering reservoir 61 has been over filled by drawing the squeegee 69 and the liquid 67 across the surface 63, the quantity of liquid 67 in the reservoir 61 is established precisely and the surface 63 is cleansed of all liquid 67 by drawing a linear edge 75 of a knife blade 77 across the surface 63 as shown in FIG. 5.

The metering reservoir 61 is formed to have substantially the same shape as that desired for the reinforcement member 51. Thus, in the preferred embodiment of this invention, the metering reservoir 61 is annular-shaped having a uniformed depth into the plate 65, a width "W" and an inner diameter "$D_r$" about a central axis 71 which is greater than the diameter "$D_a$" of the central aperture 29 in the flexible recording disk 27. The inner diameter of "$D_r$" of the annular-shaped reservoir 61 is generally formed to be 0.010 inches larger in diameter than the diameter of "$D_a$" of the central aperture 29 and the width W of the annulus of the metering reservoir 61 is generally between three sixteenths to one quarter of an inch. The reservoir 61 is formed to have a depth such that the image transferred to the flexible recording disk 27 has a maximum thickness lying between three and five ten-thousandths of an inch (0.0003 to 0.0005).

While different materials may be used to form the reinforcement member 51, the liquid 67 to be coated on the surface 63 must be capable of subsequent solidification and preferably will be electrically conductive when so solidified. Further, the liquid 67 must not significantly dissolve the coating 41 and/or the flexible material 45 or interdiffuse into either of them thus causing them to swell. In the preferred embodiment the liquid 67 comprises a mixture including cross-linkable, nonsolvent based polyolefin monomer material in combination with a cross-linking agent, such as a peroxide material. Such a mixture of monomer and cross-linking agent is UV8404 manufactured by Solex Corporation. One property of this class of materials is that exposure to ultraviolet radiation produces free radicals which cause the monomer to polymerize. The frictional properties of these materials, when solidified, may be reduced by the addition thereto of slip agents such as long chain fatty acids or long chain fatty acid esters of hydrocarbons having twelve or more carbon atoms. Similarly, the electrical conductive properties of these materials, when solidified, may be enhanced by the addition thereto of finely divided particles of carbon such as graphite or of conductive metals is as well known in the art. In the preferred embodiment of the method of this invention, the liquid 67 also contains surfactants and is vacuum degassed to remove entrained gases therefrom prior to being coated on the surface 63. This is done to assure uniform coverage of the transferred image. Good quality transferred images are obtained if a fifty milliliter quantity of UV8404 is degassed for approximately five minutes.

Once deposited in the reservoir 61, the liquid 67 is then removed therefrom. As shown in FIG. 6, this is done by contacting the surface 63 about the reservoir 61 with a terminal end surface 81 of a compliant tampon 83. A wide variety of shapes may be successfully employed for the end surface 81 of the tampon 83 such as spherical sections and planar sections. In the preferred embodiment, as shown in FIG. 7, the tampon 83 is annular-shaped about a cylindrical axis 85 to have an inner cylindrical surface 87 and an outer cylindrical surface 89. The end surface 81 of the tampon 83 is shaped to be a conic section whose axis is colinear with that of the axis 85. The end surface 81 is formed so that its common circular edge with the inner surface 87 may contact the plate 65 first and its common circular edge with the outer surface 89 may contact the plate 65 last. The tampon 83 is formed so that the inner surface 87 has a diameter "$D_t$" greater than the diameter "$D_a$" of the central aperture 29 in the flexible recording disk 27. The tampon 83 is fabricated from a material to have a Shore A hardness lying between one and two so as to render it extremely compliant. The tampon 83 may be fabricated by casting a suitable liquid silicone rubber material onto a disk-shaped metallic backing plate 91. If fabricated by casting, the end surface 81 will generally be coated with mold release. Before the tampon 83 may be put into service, the mold release must be cleaned from the surface 81 by means of an aromatic solvent such as lacquer thinner which does not adversely effect the properties of the cast silicone rubber. In contacting the surface 63, the tampon 83 is positioned so that its cylindrical axis 85 is essentially colinear with the axis 71 of the reservoir 61.

The flexible recording disk 27 is prepared to receive the liquid 67, now carried by the end surface 81 of the tampon 83, by being positioned on a planar end surface 95 of an anvil 97 as shown in FIG. 8. The end surface 95 of the anvil 97 is formed to have a raised cylindrically-shaped registration member 99 formed so as to fit snugly within the central aperture 29 of the flexible recording disk 27. The tampon 83 is then brought into contact with the exposed surface of the flexible recording disk 27 so that the cylindrical axis 85 is colinear with the axis 28 of the aperture 29 as shown in FIG. 9.

As shown in FIG. 10, the end surface 81 of the tampon 83 applies the liquid 67 to the coating 41 of the flexible recording disk 27 in a manner so as to cause it to have substantially the same shape as that of the reinforcing member 51 being fabricated. The tampon 83 is then removed from contact with the flexible recording disk 27 and the disk 27 is removed from the anvil 97. The liquid 67, now carried by the disk 27, is then hardened to form the reinforcement member 51. In the preferred embodiment, the polyolefin monomer of the liquid 69 is hardened to form the reinforcement member 51 by exposure to ultraviolet radiation from a lamp 101 as shown in FIG. 11 which causes the material to polymerize. In the preferred embodiment an ultraviolet light source emitting radiation having wave lengths lying between 260 to 365 nanometers is used. The method of this invention may be used to form a reinforcement member 51 on a second side of the flexible recording disk 27 once the member 51 on the first side has been hardened.

Flexible recording disks 27 having a reinforcement member 51, exhibit enhanced mechanical properties over those fabricated in accordance with the teachings of the prior art in several ways. A first improvement is that since the reinforcement member 51 is one solid piece of polymerized polyolefin, the possibility of contaminating the spindle of the apparatus for reading and writing floppy disk assemblies 20 is eliminated. In addition, flexible recording disks 27 having reinforcement members 51 exhibit a 50% reduction in the average change of the diameter "$D_a$" of the central aperture 29 brought about by temperature cycling the flexible recording disk from $-40°$ C. to $+51.6°$ C. The improved mechanical stability of the central aperture 29 may be attributed to the fact that polyolefins have a lower coefficient of expansion than the polyester material normally used for the sheet of flexible material 45 and the material normally employed for the coating 41 and because the reinforcement member 51 is rigidly bonded thereto. The enhanced mechanical stability of the central aperture 29 serves to reduce the possibility of recording track misregistration for flexible recording disks 27 having reinforcement members 51.

As with the improved mechanical properties of flexible recording disks 27 having the reinforcement member 51, the integral structure of the reinforcement member 51 assures that its electrical conductivity properties will be determined solely by its geometrical shape and by the properties of the material from which it is fabricated. Such a reinforcement will be immune to changes in electrical conductivity as might be caused by contamination adhering to adhesive 47 oozing out from between the surface of the flexible recording disk 27 and the reinforcement member 39 of the prior art.

Furthermore, flexible recording disks 27 having reinforcement members 51 are more easily centered about the spindle of the apparatus for reading and writing floppy disk assemblies 20 during insertion thereof than those constructed in accordance with prior art methods. The addition of friction reducing agents to the liquid 67 permits fabricating reinforcement members 51 having frictional properties precisely controlled by the formulation thereof. Also, the addition of flow agents to the liquid 67 permits close control of the surface smoothness and of the curvature of the edge of the reinforcement member 51. Since the material forming the member 51 is liquid until hardened and also because of the method by which the liquid 67 is applied, it is impossible for the member 51 thus formed to have sharply defined corners and substantially vertical edge surfaces as will generally be found on the punched reinforcement members 39 of the prior art.

Although the present invention has been described in terms of the present preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. A method of forming a reinforcement about a central aperture of a flexible recording disk as may be incorporated into a floppy disk assembly comprising the steps of:
    a. placing a first annular-shaped side surface of said flexible recording disk into contact with a planar surface having a registration member so that said central aperture of said disk surrounds said registration member;
    b. filling an open metering reservoir, of a shape approximately the desired shape of said reinforcement and recessed into a surface of a plate, with a quantity of a solidifiable liquid having characteristics making it suitable for utilization as a reinforcement when solidified;
    c. contacting said surface of said plate about said reservoir with a terminal end surface of a compliant tampon whereby said liquid transfers from said reservoir to said terminal end surface of said tampon;
    d. contacting a second annular-shaped side surface of said flexible recording disk with said liquid coated terminal end surface of said tampon so that said liquid is transferred to and adheres to said surface of said flexible recording disk about said central aperture thereof; and
    e. causing said liquid to form a structural reinforcement of an annular region around said central aperture of said flexible recording disk by causing said liquid to solidify into said surface of said flexible recording disk to which it adheres.

2. The method of claim 1 wherein said registration member is cylindrically-shaped to snugly fit said central aperture of said flexible recording disk.

3. The method of claim 1 wherein said open metering reservoir is annular-shaped and formed to have a uniform depth into said plate and an innermost diameter greater than that of said central aperture of said flexible recording disk.

4. The method of claim 3 wherein said surface of said plate into which said open metering reservoir is recessed is substantially planar, and said quantity of liquid filling said reservoir is established by first coating said planar surface with said liquid and by then cleansing all liquid from said planar surface by drawing a substantially linear edge of a knife blade thereacross.

5. The method of claim 1 wherein said liquid includes cross-linkable, non-solvent based polyolefin monomer material and a cross-linking agent, said liquid combination being capable of producing free radicals when exposed to ultraviolet radiation thus rendering said material polymerizable.

6. The method of claim 1 wherein said tampon is fabricated from a material having a Shore A hardness lying between one and two.

7. The method of claim 1 wherein said tampon is annular-shaped to have an inner diameter about a central axis thereof which is greater than said central aperture of said flexible recording disk, and wherein said terminal end of said tampon contacting said plate is formed to have a conic-section shaped surface whose axis is colinear with said annular central axis.

8. The method of claim 1 further comprising the step of degassing said liquid prior to filling said metering reservoir therewith.

9. The method of claim 1 wherein said solidifiable liquid contains electrically conductive materials therein, whereby, during use, discharge of any electrostatic charge on said flexible recording disk processed in accordance herewith is facilitated.

* * * * *